INVENTOR
JOSEF WUCHERER

ATTORNEYS

United States Patent Office 3,398,997
Patented Aug. 27, 1968

3,398,997
PIVOTED SHOE BEARING
Josef Wucherer, Zurich, Switzerland, assignor to Escher Wyss Aktiengesellschaft, Zurich, Switzerland, a corporation of Switzerland
Filed Aug. 20, 1965, Ser. No. 481,274
Claims priority, application Switzerland, Oct. 9, 1964, 13,150/64
5 Claims. (Cl. 308—2)

ABSTRACT OF THE DISCLOSURE

A pivoted shoe bearing including two relatively movable members, bearing shoes carried on one of the members by means of a support pivoted on that member, the shoes forming tapered lubricant-filled bearing gaps with the other members and shoes being displaceable relatively to the support in the direction of relative movement so the gap tapers in the direction of the relative movement and the taper is maintained at an optimum value.

Figure 1:
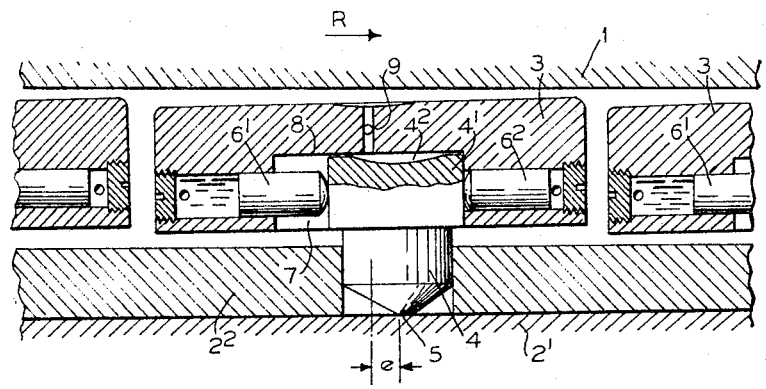

This invention relates to a pivoted shoe bearing, in particular a shaft bearing, in which a shaft length or tracking ring of a rotor slides on a circular series of bearing shoes resting in the bearing body, and in which the sliding surface of said shoes adjusts itself in relation to the sliding surface of the rotor under the influence of the lubricating film.

In known bearings of this kind, as a rule, the bearing shoes are mounted in the bearing body on a supporting point situated somewhat behind the middle of the bearing shoe in the direction of movement of the rotor, whereby optimum formation of the lubricating film can be attained with correspondingly small bearing friction (liquid friction). If such a shaft bearing is operated in the other direction of rotation, the bearing friction is relatively high. If, however, the supporting point of the bearing shoe is arranged in its middle, the bearing friction is higher for both directions of rotation, which results in lower overall efficiency. In addition, the oil cooler, and sometimes even the sliding surface have to be increased.

It is the aim of this invention to eliminate these drawbacks. In a bearing of the hereinbefore described kind, having two relatively movable bearing members and pivoted bearing shoes, for this purpose according to the invention, each bearing shoe has a supporting element. The shoe and the supporting element are movable relatively to one another so that in effect the point of support of the shoe is moved in the direction of the relative movement of the bearing members.

Constructional examples of the subject of the invention are illustrated in simplified form in the drawing.

Figure 2:
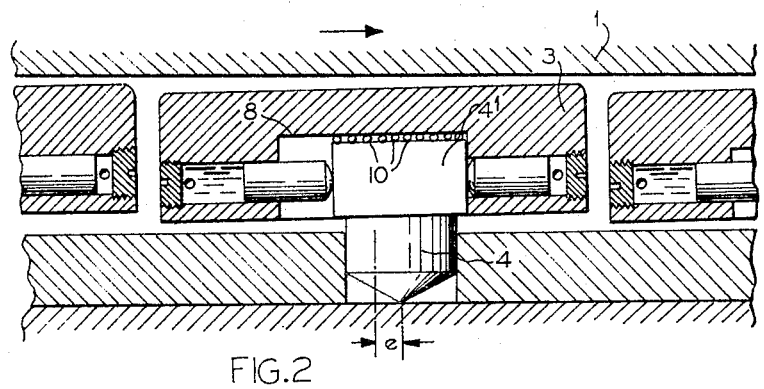
Figure 3:
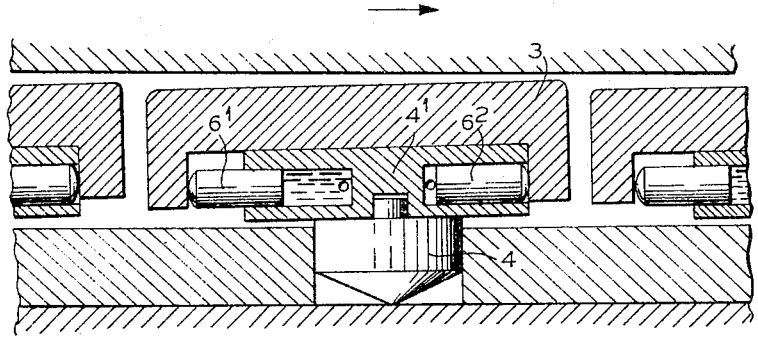

FIG. 1 shows an axially parallel section in the peripheral direction through a bearing shoe of an axial bearing, FIGS. 2 and 3 show corresponding sections through further constructional examples of the subject of the invention.

The rotor of the axial bearing shown in FIG. 1 has two relatively movable bearing members, namely a track ring 1, rotating with the shaft, not shown, and a stationary bearing body $2^1$. Mounted on said bearing body $2^1$ are bearing shoes 3, only one whole one is shown. The bearing shoe 3 has a single supporting element 4 which, at a supporting point 5, transmits to the bearing body $2^1$ the force taken up by the bearing shoe 3. The supporting element 4 is of fixed height and is surrounded with clearance by a bearing body upper part $2^2$, so that it is tiltable about the supporting point 5. Regarded in the direction of movement of the track ring 1 denoted by R, the supporting point 5 lies by the amount $e$ behind the middle of the bearing shoe 3. The upper face of the bearing shoe 3 forms with the track ring 1 a lubricant containing bearing gap.

The bearing shoe 3 is displaceable in the peripheral direction of the rotor or its track ring 1, relative to the supporting element 4. For this purpose, hydraulic servomotors $6^1$ and $6^2$ are provided. The supporting element 4 extends into a recess 7 of the bearing shoe 3, and the cylinders of the servomotors $6^1$ and $6^2$ are arranged on both sides of the recess 7 in the bearing shoe 3.

A slide $4^1$ of the supporting element 4 bears against a slide track 8 of the bearing shoe, said slide track extending substantially parallel to the sliding surface of the bearing shoe 3. Pressurised oil lubrication is provided between the slide $4^1$ and the slide track 8. For this purpose, the slide $4^1$ has a depression $4^2$, into which opens a duct 9 situated in the bearing segment 3. On starting or on changing the direction of rotation of the rotor, this duct supplies the depression $4^2$ and the gap between track ring 1 and bearing shoe 3 with pressurised oil from a source of pressurised oil not shown.

In the position shown of the bearing shoe 3 for the direction of rotation R of the track ring 1, the servomotor $6^1$ receives pressurised oil from a source of pressurised oil, not shown. In the opposite direction of rotation of the track ring, the servomotor $6^1$ is relieved of load, and the servomotor $6^2$ receives pressurised oil. The bearing shoe 3 is thereby shifted from the position shown, situated by the amount $e$ to the left of the middle of the supporting element 4, into a position, situated by the amount $e$ to the right of the middle of the bearing shoe 3.

In this way, the supporting point 5 is always at the correct point relatively to the sliding surface of the bearing shoe 3, and the shaft bearing has the same low frictional resistance in both directions of rotation as the known bearing with the eccentrically supported bearing shoes has in one direction of rotation.

By suitably shutting off the supply and discharge conduits of the servomotors $6^1$ and $6^2$ or by a mechanical locking means, the supporting element 4 and bearing shoe 3 can be held fast relatively to one another in any desired intermediate position. Thus, during operation of the machine equipped with this bearing, the supporting point, for example with the aid of measurements of bearing oil temperature, can be positioned at the optimum place, which can never be determined exactly by calculation. Thus, better results can be obtained with the bearing in both directions of rotation than with the known bearing, which furthermore operates well in only one direction of rotation.

The bearing shown in FIG. 2 has a roller bearing 10 between the slide $4^1$ of the supporting element 4 and the slide track 8 of the bearing shoe 3.

In the embodiment shown in FIG. 3, the slide $4^1$ of the supporting element 4 is made wider, so that the cylinders of the servomotors $6^1$ and $6^2$ can be accommodated in it.

The embodiments shown with reference to the example of an axial bearing may naturally be applied to radial bearings.

What is claimed is:
1. A bearing comprising two relatively movable members; bearing shoes cooperating with one of said members and forming with the other of said members a lubricant containing bearing gap; each of said bearing shoes having a single supporting element pivotally mounted on said one member; the bearing shoe being displaceable relatively to said supporting element in the direction of relative move- ment of said members; the supporting element having a slide and the bearing shoe having a slide track for receiving said slide; and servomotor means to shift said shoes relatively to the support in a direction opposite to the direction of movement of the other member relatively to said one member.

2. The bearing defined in claim 1 in which the servomotor means includes double-acting hydraulic servomotors, each controlling the displacement of a bearing shoe relatively to the supporting element.

3. The combination defined in claim 2 in which the bearing shoe has a recess facing said one bearing member and in which said supporting element is arranged displaceably in said recess.

4. The combination defined in claim 3 in which the hydraulic servomotors are in the bearing shoe.

5. The combination defined in claim 3 in which the hydraulic servomotors are in the supporting element.

References Cited

UNITED STATES PATENTS

| | | | |
|---|---|---|---|
| 1,229,291 | 6/1917 | Kingsbury | 308—160 |
| 1,441,614 | 1/1923 | Wadsworth | 308—160 |
| 1,445,188 | 2/1923 | Wadsworth | 308—160 |
| 2,063,570 | 12/1936 | Wallgren | 308—73 |
| 2,557,422 | 6/1951 | Freux | 308—160 |
| 2,858,173 | 10/1958 | Leibach | 308—9 |
| 3,023,055 | 2/1962 | Thompson | 308—73 |
| 1,437,788 | 12/1922 | Wadsworth | 308—160 |
| 3,093,426 | 6/1963 | Cornford | 308—73 |

FOREIGN PATENTS 721,131  12/1954  Great Britain.

MARTIN P. SCHWADRON, *Primary Examiner.*

L. L. JOHNSON, *Assistant Examiner.*